US008787558B2

(12) United States Patent
Gupta

(10) Patent No.: US 8,787,558 B2
(45) Date of Patent: Jul. 22, 2014

(54) LOW COMPLEXITY, OPTIMIZED POWER MANAGEMENT SCHEME FOR VERY HIGH SPEED DIGITAL SUBSCRIBER LINE TRANSCEIVERS 2

(75) Inventor: Sanjay Gupta, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 167 days.

(21) Appl. No.: 13/566,607

(22) Filed: Aug. 3, 2012

(65) Prior Publication Data

US 2013/0034133 A1 Feb. 7, 2013

Related U.S. Application Data

(60) Provisional application No. 61/515,376, filed on Aug. 5, 2011.

(51) Int. Cl.
*H04M 1/00* (2006.01)
*H04L 5/12* (2006.01)
*H04M 11/06* (2006.01)

(52) U.S. Cl.
CPC .............. *H04M 11/062* (2013.01); *Y02B 60/36* (2013.01)
USPC ..................................... 379/399.01; 375/265

(58) Field of Classification Search
None
See application file for complete search history.

(56) References Cited

U.S. PATENT DOCUMENTS

| 2009/0022213 A1* | 1/2009 | Shi ................................. 375/219 |
| 2012/0026926 A1* | 2/2012 | Frenzel et al. ................. 370/311 |

FOREIGN PATENT DOCUMENTS

| EP | 1998524 A1 | 12/2008 |
| EP | 2043277 A1 | 4/2009 |
| EP | 2237470 A1 | 10/2010 |

OTHER PUBLICATIONS

Redfern, A., et al., "An Efficient L2 Mode for VDSL2," ITU-T Study Group 15—Delayed Contribution 1067, Texas Instruments, Apr. 19-30, 2004, 10 pages.
Foreign Communication From a Related Counterpart Application, PCT Application PCT/US2012/049542, International Search Report dated Oct. 15, 2012, 5 pages.
Foreign Communication From a Related Counterpart Application, PCT Application PCT/US2012/049542, Written Opinion dated Oct. 15, 2012, 6 pages.
"Series G: Transmission Systems and Media, Digital Systems and Networks—Digital Sections and Digital Line System—Access Networks—Asymmetric Digital Subscriber Line Transceivers 2 (ADSL2)—Annex C: Specific Requirements for an ADSL System Operating in the Same Cable as ISDN as Defined in Appendix III of Recommendation ITU-T G.961," G.992.3, Annex C, Apr. 2009, 296 pages.

(Continued)

*Primary Examiner* — Fan Tsang
*Assistant Examiner* — Jeffrey Lytle
(74) *Attorney, Agent, or Firm* — Conley Rose, P.C.; Grant Rodolph; Rayhao A. Chung

(57) ABSTRACT

An apparatus comprising a processor configured to determine a power management (PM) state from a plurality of PM states for a digital subscriber line (DSL) transceiver, wherein the plurality of PM states comprise a idle state, a full on state, and a low power state, wherein the full on state consumes more power than the low power state, wherein the low power state consumes more power than the idle state, wherein the low power state comprises at least one PM profile, and wherein the DSL transceiver supports a very high speed digital subscriber line 2 (VDSL2) data transmission protocol, and instruct the DSL transceiver to use the PM state.

45 Claims, 9 Drawing Sheets

(56) References Cited

OTHER PUBLICATIONS

"Series G: Transmission Systems and Media, Digital Systems and Networks—Digital Sections and Digital Line System—Access Networks—Asymmetric Digital Subscriber Line Transceivers 2 (ADSL2)," G.992.3, Apr. 2009, 404 pages.

"Series G: Transmission Systems and Media, Digital Systems and Networks—Digital Sections and Digital Line System—Access Networks—Asymmetric Digital Line Transceivers 2 (ADSL2)—Extended Bandwidth (ADSL2plus), Annex C: Specific Requirements for an ADSL System Operating in the Same Cable as ISDN as Defined in Appendix III of Recommendation ITU-T G.961," G.992.5, Annex C, Jan. 2009, 66 pages.

"Series G: Transmission Systems and Media, Digital Systems and Networks—Digital Sections and Digital Line System—Access Networks—Asymmetric Digital Line Transceivers 2 (ADSL2)—Extended Bandwidth (ADSL2plus)," G.992.5, Jan. 2009, 110 pages.

Trojer, et al., "Power Saving Modes for GPON and VDSL," Proceedings 13th European Conference Network & Optical Communications, Krems, Austria, Jun. 30-Jul. 3, 2008, pp. 160-169.

"ADSL: L2 Mode and Services," ITU—Telecommunications Standardization Sector, Study Group 15, Question: 4/15, Temporary Document 09VS-051, Valencia, Spain, Nov. 16-20, 2009, 3 pages.

"ADSL, VDSL: Requirements for Low Power Mode," ITU—Telecommunications Standardization Sector, Study Group 15, Question 4/15, Temporary Document 10RB-034, Red Bank, New Jersey, Nov. 15-18, 2010, 2 pages.

"G.VDSL: Discontinuous VDSL2," ITU—Telecommunications Standardization Sector, Study Group 15, Question: 4/15, Temporary Document 11II-028, Indianapolis, Indiana, May 3-6, 2011, 3 pages.

"G.vdsl: Low Power Modes for Remote VDSL2 Nodes," ITU—Telecommunications Standardization Sector, Study Group 15, Question 4/15, Temporary Document 10RB-046, Geneva, Switzerland, Nov. 15-19, 2010, 3 pages.

"G.vdsl: Operator Requirements for a Future VDSL2 Low Power Mode," ITU—Telecommunications Standardization Sector, Study Group 15, Question: 4/15, Temporary Document 10RB-045, Red Bank, New Jersey, Nov. 15-19, 2010, 3 pages.

* cited by examiner

LOW COMPLEXITY, OPTIMIZED POWER MANAGEMENT SCHEME FOR VERY HIGH SPEED DIGITAL SUBSCRIBER LINE TRANSCEIVERS 2

CROSS-REFERENCE TO RELATED APPLICATIONS

The present application claims priority to U.S. Provisional Patent Application No. 61/515,376 filed Aug. 5, 2011 by Sanjay Gupta and entitled "A Low Complexity, Optimized Power Management Scheme for Very High Speed Digital Subscriber Line Transceivers 2", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide a large bandwidth for digital communications over exiting subscriber lines. When transmitting data over subscriber lines, some DSL technologies use a discrete multi-tone (DMT) line code that allocates a plurality of bits for each sub-carrier or tone in each symbol. The DMT may be adjusted to various channel conditions that may occur at each end of a subscriber line. Typically, a plurality of power management (PM) states may be used in DSL technologies. For example, in the International Telecommunication Union Telecommunication Standardization Sector (ITU-T) Recommendation G.992.3 entitled "Asymmetric Digital Subscriber Line Transceivers 2 (ADSL2)" and Recommendation G.992.5 entitled "Asymmetric Digital Subscriber Line Transceivers 2—Extended Bandwidth (ADSL2 plus or ADSL2+)", which are incorporated herein by reference, three PM or link states are defined. The three PM states comprise a link state for full on mode (denoted as L0), a link state for low power mode (denoted as L2), and a link state for idle mode (denoted as L3). The term state and mode may be used interchangeably herein. For example, a low power mode (LPM) may also be referred to as a low power state.

SUMMARY

In one embodiment, the disclosure includes an apparatus comprising a processor configured to determine a power management (PM) state from a plurality of PM states for a digital subscriber line (DSL) transceiver, wherein the plurality of PM states comprise a idle state, a full on state, and a low power state, wherein the full on state consumes more power than the low power state, wherein the low power state consumes more power than the idle state, wherein the low power state comprises at least one PM profile, and wherein the DSL transceiver supports a very high speed digital subscriber line 2 (VDSL2) data transmission protocol, and instruct the DSL transceiver to use the PM state.

In another embodiment, the disclosure includes a method comprising determining a power management (PM) state from a plurality of PM states for a digital subscriber line (DSL) transceiver, wherein the plurality of PM states comprise a idle state, a full on state, and a low power state, wherein the full on state consumes more power than the low power state, wherein the low power state consumes more power than the idle state, wherein the low power state comprises at least one PM profile, and wherein the DSL transceiver supports a very high speed digital subscriber line 2 (VDSL2) data transmission protocol, and instructing the DSL transceiver to use the PM state.

In yet another embodiment, the disclosure includes an apparatus comprising a digital subscriber line (DSL) transceiver configured to: receive a power management (PM) command comprising information regarding a PM state, wherein the PM state is selectable from a plurality of available PM states, wherein the plurality of available PM states comprise a full on state, a low power state, and an idle state, wherein the full on state consumes more power than the low power state, wherein the low power state consumes more power than the idle state, wherein the low power state comprises at least one PM profile, wherein the DSL transceiver supports a very high speed digital subscriber line 2 (VDSL2) data transmission protocol, and transition to the PM state based on the PM command.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
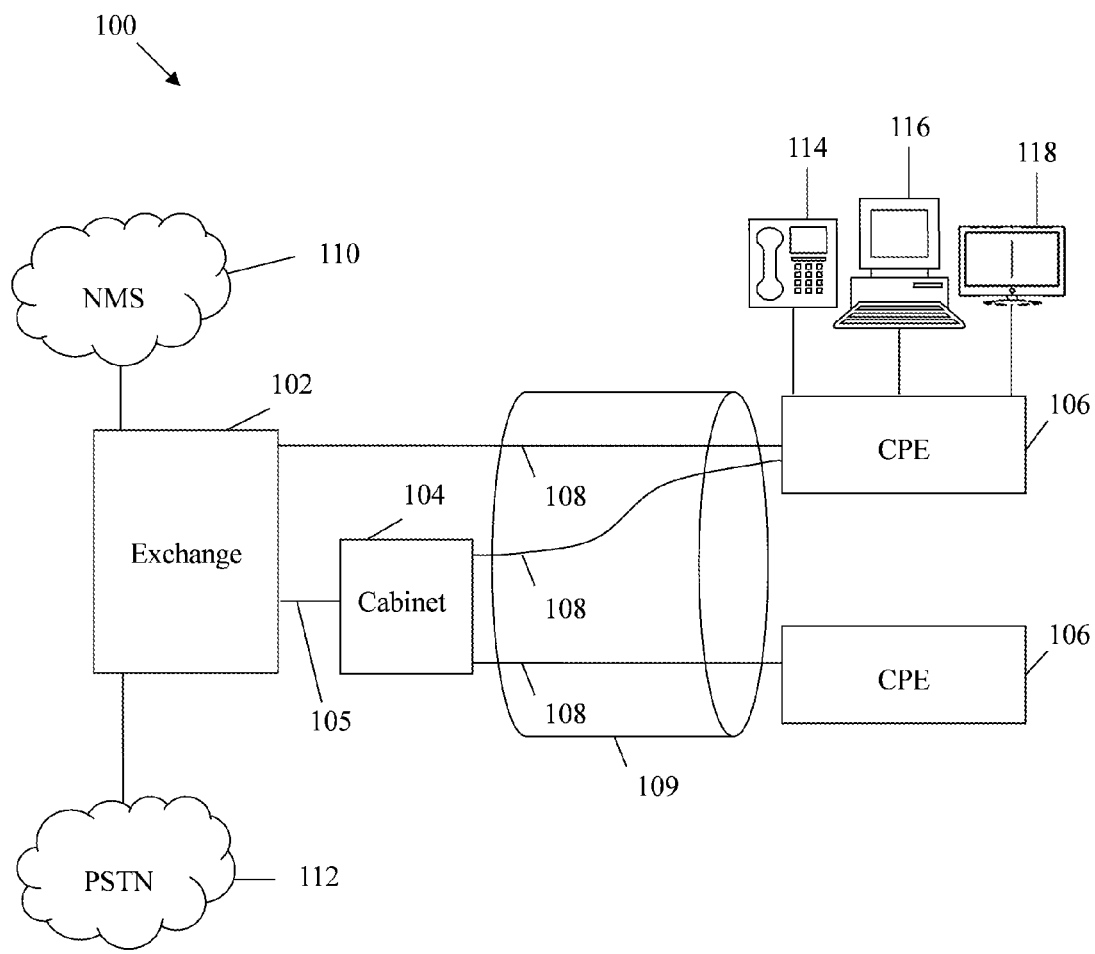
FIG. 1 is a schematic diagram of an embodiment of a DSL system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In use, a subscriber line may be idle or have little user traffic. Thus, DSL transmitters and receivers (transceivers) may take advantage of this fact to reduce power consumption by reducing a transmitted or received signal level. A DSL transceiver (e.g., a modem) may be configured to switch between the L0 and L2 modes during periods of intermittent user traffic. For example, the L0 mode may be used during a showtime or full on (sometimes denoted in capitalized form as ON) period of a user traffic duty-cycle. In the L0 mode, the DSL transceiver may be fully functional. On the other hand, the L2 mode may be used during a temporary off (sometimes denoted in capitalized form as OFF) period of the user traffic duty cycle. In the L2 mode, the DSL transceiver may be active but may transmit data at a reduced downstream or upstream rate, so that overall power consumption of the DSL modem may be reduced. In case there is an extended OFF period or down-time in user traffic, the DSL transceiver may be configured to switch to the L3 idle (sometimes denoted in capitalized form as IDLE) mode. Since the DSL transceiver may transmit no data at all in the L3 mode, further power savings may be achieved.

The ITU-T Recommendation G.993.2 entitled "Very High Speed Digital Subscriber Line Transceivers 2 (VDSL2)", which is hereby incorporated by reference, is an upgrade over ADSL2 and ADSL2+, since it may provide various advantages such as higher data rates, more services, and more robustness. It should be noted that VDSL2, which is an upgraded data transmission protocol or standard, may be based on the Recommendation G.993.2, but it may also include other relevant ITU-T recommendations or specifications. In use, the PM states as defined in ADSL2 and ADSL2+ may have potential limitations and/or issues when being incorporated into VDSL2. For example, the VDSL2 protocol defines certain profiles that may support close to 3000 sub-carriers (sometimes referred to simply as carriers). This number is significantly higher than the ADSL2+ standard, which may support on the order of 500 carriers. For another example, the VDSL2 protocol may have higher complexity (e.g., an order of magnitude higher) in upstream communication. Certain VDSL2 upstream profiles may have close to 2500 carriers, which is significantly higher than ADSL2+ with only close to 60 carriers. Consequently, in VDSL2 systems, a relatively higher portion of power may be consumed in a receiver of a central office (CO), as the receiver handles upstream communication.

For yet another example, compared to ADSL2+ the VDSL2 protocol may use higher frequencies, e.g., up to 30 megahertz (MHz). As a result, there may exist more crosstalk between DSL pairs in a bundle. The crosstalk may impact conditions, such as signal to noise ratio (SNR), of other lines in the same bundle. Further, PM transitions may also cause time-varying crosstalk between the pairs, which in turn leads to potential instability, retrains, and/or other undesirable consequences. For yet another example, the VDSL2 protocol may support higher data rates and more versatile services (e.g., triple-play services including internet, TV and phone). Also, VDSL2 may support different application scenarios including video streaming, voice lines, and data services. Each of these services may have different data bandwidth requirements, thus it may be desirable to optimize power consumption for different application scenarios. In use, if directly extended to VDSL2, the current ADSL2 PM states (e.g., L0, L2, and L3) may add significant memory and processing power burden. Moreover, the L2 state (i.e., low power mode) currently defined in the ADSL2 standard may not be robust enough to meet service requirements of VDSL2 applications. Thus, a low power mode may have been left undefined in the current VDSL2 protocol.

Disclosed herein are systems and methods for improved power management in the VDSL2 protocol. A transceiver used in a VDSL2 system may be configured to operate in a plurality of PM states. In addition to a full on state and an idle state which are already included in the plurality of PM states, the present disclosure proposes to add a low power state. Each PM state may comprise one or more PM profiles, and each PM profile may comprise a plurality of parameters. In an embodiment, the low power state comprises a plurality of PM profiles. The transceiver may be transitioned or switched from one PM state to another. Within the low power state, the transceiver may be transitioned from one PM profile to another. PM commands may be used to perform state/profile transitions. Since a number of parameters in a PM profile may be large, in an embodiment, each PM profile is assigned a profile index when being stored in the transceiver. The PM profile may be identifiable by the PM commands via the profile index. In addition, a plurality of tone groups may be used to represent upstream/downstream sub-carriers, with each tone group representing a set of sub-carriers. In an embodiment, a maximum number of tone groups is 128. Furthermore, online reconfiguration (OLR) may be supported in the disclosed PM schemes. Several types of OLR commands may be used to change a parameter of a PM profile without interruption of service. The disclosed PM schemes may have low complexity and may provide more efficient PM, thus realizing extra power savings while fulfilling service requirements.

FIG. 1 illustrates a schematic diagram of an embodiment of a VDSL2 system 100, wherein disclosed PM schemes may be implemented. The VDSL2 system 100 may comprise an exchange 102, a cabinet 104 coupled to the exchange 102 by a cable 105, and a plurality of customer premises equipment (CPEs) 106, which may be coupled to the exchange 102 and/or the cabinet 104 via a plurality of subscriber lines 108. At least some of the subscriber lines 108 may be bundled in a binder 109. Additionally, the VDSL2 system 100 may optionally comprise a network management system (NMS) 110 and a public switched telephone network (PSTN) 112, both of which may be coupled to the exchange 102. In other embodiments, the VDSL2 system 100 may be modified to include splitters, filters, management entities, and various other hardware, software, and functionality.

The NMS 110 may be a network management infrastructure that processes data exchanged with the exchange 102 and may be coupled to one or more broadband networks, such as the Internet. The PSTN 112 may be a network that generates, processes, and receives voice or other voice-band signals. In an embodiment, the exchange 102 may be a server located at a CO and may comprise switches and/or splitters, which may couple the NMS 110, the PSTN 112, and the subscriber lines 108. For instance, the splitter may be a 2:1 coupler that forwards data signals received from the subscriber lines 108 to the NMS 110 and the PSTN 112, and forwards data signals received from the NMS 110 and the PSTN 112 to the subscriber lines 108. Further, the splitter may optionally comprise one or more filters to help direct data signals between the NMS 110, the PSTN 112, and the subscriber lines 108. Additionally, the exchange 102 may comprise at least one DSL transmitter/receiver (transceiver), which may exchange signals between the NMS 110, the PSTN 112, and the subscriber lines 108. The signals may be received and transmitted using the DSL transceiver such as a modem. In an embodiment, the DSL transceiver may comprise a forward error correction (FEC) codeword generator that generates FEC data, an interleaver that interleaves the transmitted data across a plurality of sub-carriers, or both. For instance, the DSL transceiver may use a discrete multi-tone (DMT) line code that allocates a plurality of bits for each sub-carrier or tone in each symbol. The DMT may be adjusted to various channel conditions that may occur at each end of a subscriber line. In an embodiment, the DSL transceiver of the exchange 102 may be configured to transmit data at similar or different rates for each subscriber line 108.

In an embodiment, the cabinet 104 may be located at a distribution center between the CO and customer premises and may comprise switches and/or splitters, which may couple the exchange 102 to the CPEs 106. For instance, the cabinet 104 may comprise a DSL access multiplexer (DSLAM) that couples the exchange 102 to the CPEs 106. Additionally, the cabinet 104 may comprise a DSL transceiver, which may be used to exchange signals between the exchange 102 and the CPEs 106. The DSL transceiver may process the received signals or may simply pass the received signals between the CPEs 106 and the exchange 102. The splitter in the cabinet 104 may be a N:1 coupler (where N is an integer) that routes data signals received from the exchange 102 to N CPEs 106, and routes data signals received from the N CPEs 106 to the exchange 102. The data signals may be transmitted and received using the DSL transceiver. Further, the splitter of the cabinet 104 may optionally comprise one or more filters to help direct data signals between the exchange 102 and the CPEs 106 via the corresponding subscriber lines 108. In an embodiment, the DSL transceiver may be configured to transmit data to the CPEs 106 at similar or different rates and/or power for each subscriber line 108. The cabinet 104 may also be referred to herein as a remote terminal (RT) interchangeably.

In the VDSL2 standard, a transceiver may be a VDSL2 transceiver unit (VTU) at an optical network unit (VTU-O). In practice, as long as the transceiver is located at an operator end of the loop (including a CO, exchange, or cabinet), it may be referred to as a VTU-O. Sometimes, a VTU-O may also be referred to as a VTU at a central office (VTU-C). On the other hand, when a transceiver is located at a user end of the loop such as a customer premise, the transceiver may be referred to as a VTU at a remote terminal or site (VTU-R).

In an embodiment, the CPEs 106 may be located at the customer premises, where at least some of the CPEs 106 may be coupled to a telephone 114, a computer 116, and/or a television 118. The telephone 114 may be hardware, software, firmware, or combinations thereof that generates, processes, and receives voice or other voice-band signals. The CPE 106 may comprise a switch and/or a splitter, which may couple the subscriber lines 108 and the telephone 114, the computer 116, and the television 118. The CPE 106 may also comprise a DSL transceiver to exchange data between the CPE 106 and the exchange 102 via the subscriber line 108. For instance, the splitter may be a 2:1 coupler that forwards data signals received from the subscriber line 108 to the telephone 114 and the DSL transceiver, and forwards data signals received from the telephone 114 and the DSL transceiver to the subscriber line 108. The splitter may optionally comprise one or more filters to help direct data signals to and from the telephone 114 and the DSL transceiver. The DSL transceiver (e.g., a modem), may transmit and receive signals through the subscriber lines 108. For instance, the DSL transceiver may process the received signals to obtain the transmitted data from the exchange 102, and pass the received data to any of the telephone 114, the computer 116, and the television 118. The CPEs 106 may be coupled to the exchange 102 directly via the subscriber lines 108 and/or via the subscriber lines 108 and the cabinet 104. For example any of the CPEs 106 may be coupled to a subscriber line 108 from the exchange 102 and/or a subscriber line 108 from the cabinet 104. The CPEs 106 may access the NMS 110, the PSTN 112, and/or other coupled networks via the subscriber lines 108 deployed by the exchange 102 and/or the cabinet 104.

In an embodiment, the subscriber lines 108 may be telecommunications paths between the exchange 102 and the CPE 106 and/or between the cabinet 104 and the CPEs 106, and may comprise one or more twisted-pairs of copper cable. Crosstalk interference may occur between tones or signals transported through the subscriber lines 108 that are deployed by the exchange 102 and the cabinet 104, e.g. in the binder 109. The crosstalk interference may be related to the power, frequency, and travel distance of the transmitted signals and may limit communication performance in the network. For instance, when a power spectrum density (PSD) of the transmitted signals increase, e.g. over a range of frequencies, the crosstalk between the adjacent subscriber lines 108 may increase and hence the data-rates may decrease. To reduce or limit the crosstalk in the lines, the DSL transceiver of the cabinet 104 may be configured to control and adjust the PSD of the signals or tones transmitted downstream, e.g. to the CPEs 106, in any of the subscriber lines 108. The DSL transceiver may be used to reduce the PSD of a transmitted signal in a line to ensure a sufficient data-rate that meets service requirements.

Figure 2:
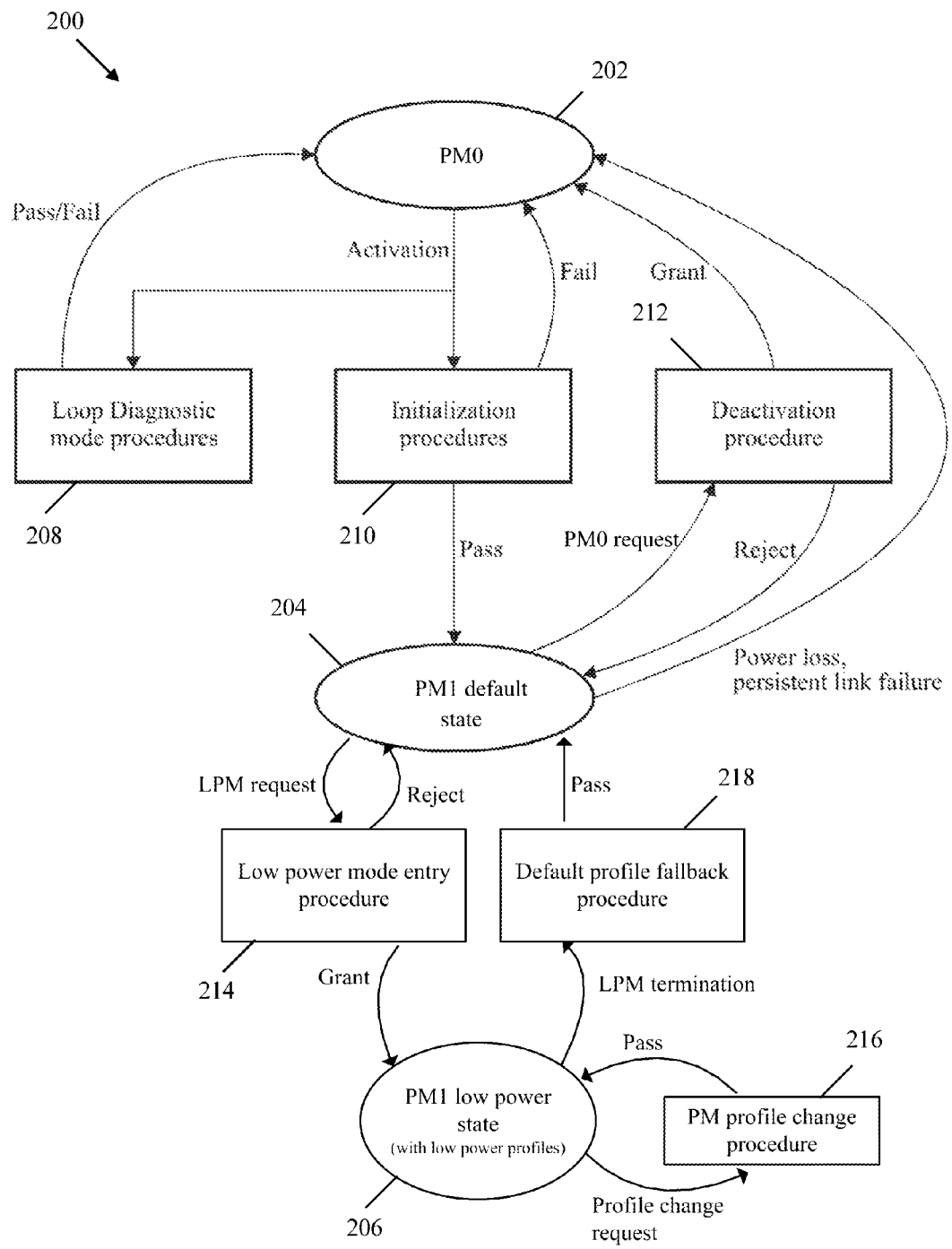
FIG. 2 is a schematic diagram of an embodiment of a power management scheme.

FIG. 2 illustrates an embodiment of a power management scheme 200, which may be implemented in a VDSL2 system (e.g., the VDSL2 system 100 in FIG. 1). The PM scheme 200 comprises a plurality of PM states (shown in oval boxes) as well as a number of procedures (shown in rectangular boxes) to transition between different PM states or between different profiles within one PM state. In an embodiment, the PM scheme 200 comprises a PM0 state a PM1 default state 204 and a PM1 low power state 206 arranged as shown in FIG. 2, wherein PM0 and PM1 are PM state denotations. The PM0 state 202 may be an idle (sometimes denoted in capitalized form as IDLE) or silent state, in which no data is transmitted by a VTU-O or a VTU-R. The PM0 state may be the same with or similar to the L3 state as defined in the G992.3 Recommendation.

The PM1 default state 204 and the PM1 low power state may be generally referred to herein as a PM1 state, which is an on (sometimes denoted in capitalized form as ON) or active state. Data may be transmitted in the PM1 state at a specified downstream or upstream rate as defined by a management entity (e.g., a CO). In an embodiment, the PM1 default state 204 is normally a full on power state, and it consumes relatively more power than the PM1 low power state 206. In this case, the PM1 default state may be the same with or similar to the L0 state as defined in the G992.3 Recommendation. Alternatively, if desired, it is possible that the PM1 default state 204 may be configured to be a low power state instead of a full on state. In this case, although referred to herein as a low power state, the PM1 low power state 206 may be reconfigured to include a showtime or full on PM profile. For example, in a DSL system where user traffic is light most of the time, a low power state directly linked to the PM0 state 202 as the default state may be convenient since only one initialization procedure is required to transition a VDSL2 transceiver from the IDLE state to the low power state.

In comparison with the G.993.2 Recommendation which currently only has the L0 and L3 states, the disclosed PM1 low power state 206 may be considered an added new state, or it may be considered an extension of the L0 state.

In use, each PM state, including the PM0 state 202, the PM1 default state 204, and the PM1 low power state 206, may comprise at least one PM profile. In an embodiment, the low power state 206 may comprise a plurality of PM profiles. Moreover, each PM profile may be a combination of a plurality of parameters. Change in one or more of the parameters may lead to a change of PM profile.

In the PM scheme 200, one state may be transitioned to another state. Similarly, one profile within a state may be transitioned to another profile within the same state. As shown in FIG. 2, transitions between states or profiles are indicated by arrows, with the event causing the transition listed next to the arrow. For example, when a VTU needs to be activated, loop diagnostic mode procedures 208 may be used to identify DSL channel conditions at both ends of a loop without transitioning to the PM1 default state 204. After the loop diagnostic mode procedures 208, the VTU may return to the PM0 state 202 with pass/fail results. Further, the PM0 state 202 may be transitioned to the PM1 default state 204 by going through initialization procedures 210. If the initialization procedures 210 pass, the transition is successful. Otherwise, the transition fails and the VTU may remain in the PM0 state 202. In addition, a deactivation procedure 212 may be utilized to transition the PM1 default state 204 back to the PM0 state. A request to transition to the PM0 state may be fed into the deactivation procedure 212. If the request is granted, the transition is successful. Otherwise, the transition is rejected and the VTU remains in the PM1 default state 204. In use, the deactivation procedure 212 may allow an orderly shutdown of an upstream or downstream DSL link. Additionally, in an event of emergency, such as a power loss or a persistent link failure, the PM1 default state 204 may be directly shutdown to the PM0 state 202.

In an embodiment, the VTU may be transitioned from the PM1 default state 204 to the PM1 low power state 206 by going through a low power entry procedure 214. A low power mode (LPM) transition request may be fed into the low power entry procedure 214. After completion of the low power entry procedure 214, if the LPM request is granted, the transition is successful. Otherwise, the transition is rejected and the VTU remains in the PM1 default state 204.

Sometimes, when the VTU is in the PM1 low power state 206, its PM profile may need to be changed without exiting the LPM. In an embodiment, a profile change request may be fed into a profile change procedure 216. If the profile change request is passed, one or more parameters may be altered, the transceiver may be transitioned to another PM profile of the PM1 low power state 206. In addition, sometimes the VTU may need to return to the PM1 default state 204 from the PM1 low power state 206, e.g., when the VTU encounters a sudden surge of user traffic. In an embodiment, a LPM termination request may be fed into a default profile fallback procedure 218. If the LPM termination request is passed, a default profile (e.g., full on PM profile) may be enforced and the transceiver may return to the PM1 default state 204. Procedures enabling the state and profile transitions described above may be fulfilled by power management commands, which are further described in paragraphs below.

In practice, a PM profile may comprise various parameters, which may be controlled by a management entity (e.g., a CO), defined by a protocol or standard (e.g., G.993.2), and/or be vendor discretionary. Take the PM1 state of a VDSL2 transceiver as an example. In the PM1 state, which includes the PM1 default state 204 and the PM1 low power state 206, standard-defined physical media dependent (PMD) and physical media specific (PMS) control parameters may include, but are not limited to, maximum_rate, minimum_rate, minimum_INP (impulse noise protection), maximum_delay, maximum_BER (bit error rate), maximum_ATP (aggregate transmit power), etc. In the PM1 state, a PM profile may be specified by various PMS parameters (e.g., a number of redundancy octets (R) and interleaver depth (D)) and PMD parameters (e.g., bits/gain (B/G) tables for tone groups). Additionally, in the PM1 state, vendor discretionary priority list of power-budgeting parameters may include preference for a number of used bands, transmit power, receive power, preference for a symbol rate, etc. These vendor discretionary parameters may be used, e.g., by a VTU-O, to realize minimal power consumption in the downstream and upstream directions.

In an embodiment, a plurality of PM profiles may be stored or saved in a VTU-O (sometimes referred to as a master modem). A variety of power management commands may be used to transition the transceiver between PM states or profiles. For example, in the PM1 low power state 206, a data rate of a subscriber line may be dynamically changed using a PM command, which improves the stability and optimality of the low power sate. In use, when a PM profile is altered, the altered version may be saved as a new PM profile or may replace the original PM profile. In addition, at any time, the master modem may issue a PM command to erase one or more PM profiles.

In use, the PM1 low power state 206 may comprise a set of downstream and upstream profiles. A number of the LPM profiles that a VDSL2 transceiver (e.g., a modem) supports may be vendor discretionary. This number depends on a number of saved profiles, which in turn depends on available memory and processing resources in the VDSL2 transceiver. At a minimum, if the VDSL2 transceiver supports a LPM, it needs to have sufficient memory and processing resources for at least one downstream LPM profile and one upstream LPM profile.

In an embodiment, one downstream PM profile and one upstream PM profile are assigned as default profiles used in the PM1 default state 204. The default profiles may be used for fast fallback transition in case a LPM needs to be terminated. The default profiles may be assigned by a CO transceiver such as a master modem. In comparison with ADSL2 whose default profile is a showtime L0 profile, the default profile of the VDSL2 may be any PM1 profile including a full on PM profile and at least one low power PM profile. In use, a fast transition to a default profile may be initiated by either a CO transceiver or a CPE transceiver using a PMD layer fallback primitive. If such a mechanism is used, the default profile may be considered a new "ON" state.

In practice, a PM profile may comprise a large number of parameters. Consequently, when transitioning between states or profiles using power management commands, a large amount of data may need to be communicated within a transceiver or between transceivers. To improve transitioning efficiency and speed, in the present disclosure each PM profile may be assigned a profile index when being stored in a transceiver. In an embodiment, a PM command may locate a stored PM profile by the profile index. Table 1 illustrates an example when a transceiver uses a table to store two downstream PM profiles (denoted as P1_ds and P2_ds) and two upstream profiles (denoted as P1_us and P2_us).

TABLE 1 an example of profile indexing in a PM1 state.

| Profile Index | Downstream Profile | Upstream Profile |
| --- | --- | --- |
| (1, 1) | P1_ds | P1_us |
| (2, 2) | P2_ds (default) | P2_us (default) |
| (1, 2) | P1_ds | P2_us |
| (2, 1) | P2_ds | P1_us |

As shown in Table 1, P2_ds and P2_us are assigned to be default profiles. The profile index contains two positions—one for downstream profiles and one for upstream profiles. In each position, a unique index is assigned to each profile. For example, in the downstream position of the profile index, an index of '1' is assigned to profile P1_ds, and an index of '2' is assigned to profile P2_ds. The use of profile indexes may allow quick switching between different profiles or states using PM commands, thereby lowering complexity of the PM scheme.

For example, if profiles P1_ds and P2_ds both have 50 parameters, communicating the profile index with two positions may be much more efficient than communicating the 50 parameters.

As mentioned previously, in the VDSL2 protocol, a large number (e.g., 3000) of sub-carriers be supported by some PM profiles. As a result, a number of sub-carriers that need to be modified during a PM state/profile transition may be quite large. To improve efficiency of conveying sub-carrier information, in the present disclosure, a plurality of sub-carriers may be represented by a set of tone groups, wherein each tone group represents more than one sub-carrier. Accordingly, PM profiles may be described by the tone groups instead of sub-carriers. In an embodiment, up to 128 tone groups are used, which equals a maximum number of online reconfigurations allowed one time in VDSL2. Upstream bands and downstream bands may have independently defined tone groups. In an embodiment, each tone group comprises a plurality of consecutive sub-carriers, and all sub-carriers in a common tone group may share a same gain and number of bits. As a number of tone groups are smaller than a number of sub-carriers represented by the tone groups, memory and processing resources occupied in a transceiver may be reduced due to tone grouping.

Figure 3:
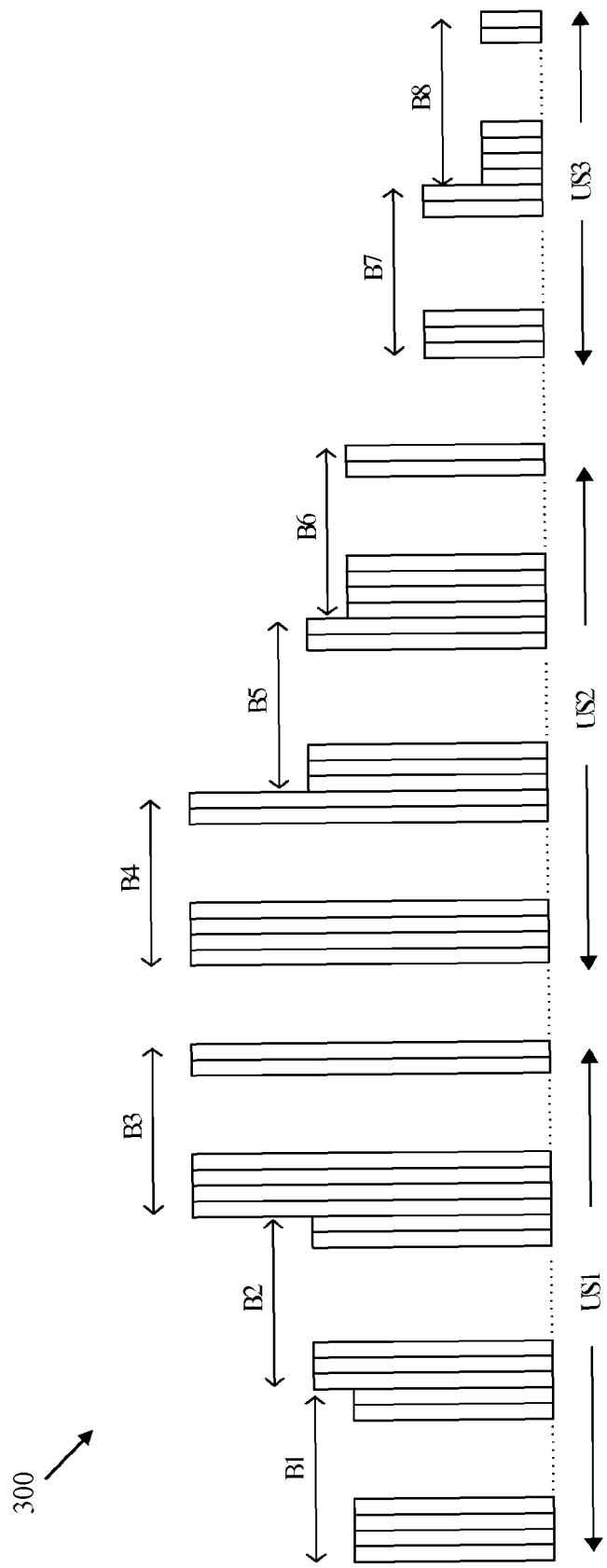
FIG. 3 is a diagram of an embodiment of a tone grouping scheme.

FIG. 3 illustrates an embodiment of a tone grouping scheme 300. It should be understood that any number of tone groups (preferably no greater than 128) may be included in a tone grouping scheme, which may be configured for a downstream link or an upstream link. For illustration purposes, the tone grouping scheme 300 comprises eight tone groups with indices or indexes denoted as B1, B2, . . . , B8. The eight tone groups divide three upstream bands, denoted as US1, US2, and US3. A tone group may have any number of sub-carriers, and each tone group may occupy a different frequency range. In practice, for a DSL receiver, the number of tone groups and the number of sub-carriers in each tone group may be vendor discretionary. In an embodiment, sub-carrier indices may be configured according to a tone group descriptor. Table 2 illustrates an example of a tone group descriptor, which may be the same or similar to a band descriptor specified in the G.993.2 Recommendation. For example, the content of field of the first octet (i.e., Octet 1) may describe the number of tone groups used. Similarly, in Octets 2-4 which has a total of 24 bits (Bits 0-23), an index of the first subcarrier in tone group B1 may be described in Bits 0-11, and an index of the last subcarrier in tone group B1 may be described in Bits 12-23. Other tone groups (e.g., B2, . . . , B8) may be similarly described. As it may be easier to store the tone groups than individual sub-carriers, the tone grouping scheme 300 may help reduce storage complexity.

TABLE 2 an example of a tone group descriptor.

| Octet | Content of field |
|---|---|
| 1 | Number of tone groups to be described |
| 2-4 | Bits 0-11: Index of the first sub-carrier in tone group B1 |
| | Bits 12-23: Index of the last sub-carrier in tone group B1 |
| 5-7 | Bits 0-11: Index of the first sub-carrier in tone group B2 |
| (if applicable) | Bits 12-23: Index of the last sub-carrier in tone group B2 |
| etc. | etc. |

In an embodiment, downstream and upstream receive functions may be used to assign tone groups in their respective directions. Downstream receive functions may be configured in CPE (e.g., the CPE 106 in FIG. 1), and upstream receive functions may be configured in a CO apparatus (e.g, the exchange 102 in FIG. 1). For optimal utilization, each PM profile may use a different tone group, which comprises a different set of sub-carriers. A tone group may be exchanged using a tone group descriptor as part of a PM command.

Figure 4:
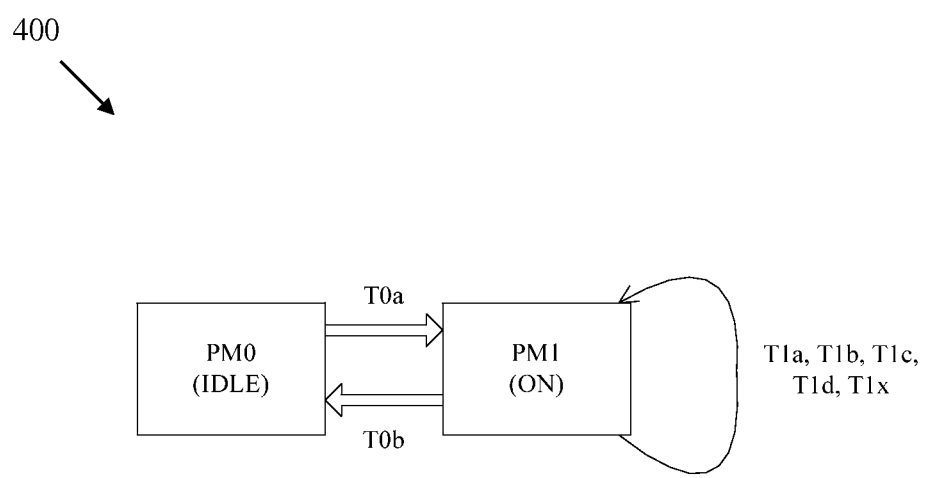
FIG. 4 is a diagram of an embodiment of a state and profile transitioning scheme.

In this disclosure, a transition may be considered a state transition when it is implemented between different PM states including the PM0 state 202, the PM1 default state 204, and the PM1 low power state 206. Otherwise, the transition may be considered a profile transition when it is implemented within one state such as the PM1 low power state 206. FIG. 4 illustrates an embodiment of a state and profile transitioning scheme 400. It should be noted that a disclosed transitioning scheme may comprise any number of PM states and/or any number of state/profile transitions. For illustration purposes, the transitioning scheme 400 comprises three PM states (i.e., the PM0 state, the PM1 default state, and the PM1 low power state). For simplicity, the PM1 default state and the PM1 low power state are shown as one state—the PM1 state. A first state transition, labeled as T0a, transits from PM0 to PM1, while a second state transition, labeled as T0b, transits from PM1 to PM0. Within the PM1 state, four profile transitions, labeled as T1a, T1b, T1c, T1d, as well as one state transition, denoted as T1x, are listed.

Table 3 illustrates an embodiment of procedures which may be used to implement the transitioning scheme 400. In Table 3, an initiating event may refer to a local command communicated within a VTU-O or a VTU-R.

TABLE 3 examples of PM state and profile transitions.

| Label | Starting state | Resulting state | Initiating event | Procedure |
|---|---|---|---|---|
| T0a | PM0 | PM1 | Local command to either the VTU-O or VTU-R | Following this event, the VTUs use an initialization procedure specified in G.993.2 or a fast retrain initialization procedure specified in G.992.3. |
| T0b | PM1 | PM0 | Local command to either the VTU-O or VTU-R | Following this event, the initiating VTU sends a power management command. After the responding VTU grants the request, both VTUs stop transmitting and enter the IDLE state. |

TABLE 3-continued examples of PM state and profile transitions.

| Label | Starting state | Resulting state | Initiating event | Procedure |
|---|---|---|---|---|
| T1a | PM1 | PM1 | Local command to the VTU-O | Following this event, the VTU-O sends a power management command with new downstream and upstream profile indexes. The VTU-R grants profile change by transmitting a PMD.Synchflag primitive (defined in the ADSL2 standard). After receiving the grant, the VTU-O also sends a PMD.Synchflag primitive to complete a PMD handshake. Then, the VTU-O and VTU-R are reconfigured to the new profile. |
| T1b | PM1 | PM1 | Local command to the VTU-O | Following this event, the VTU-O sends a power management command with a downstream profile index and a set of new upstream parameters (e.g., PMS parameters, tone group indices, etc.). The VTU-R grants profile change by transmitting a PMD.Synchflag primitive. After receiving the grant, the VTU-O also sends a PMD.Synchflag primitive to complete the PMD. Then, the VTU-O and VTU-R are reconfigured to the new profile. |
| T1c | PM1 | PM1 | Local command to the VTU-O | Following this event, the VTU-O sends a power management command with an upstream profile index and a set of new downstream parameters (e.g., PMS parameters, tone group indices, etc.). The VTU-R grants profile change by transmitting a power management command with a set of new downstream tone group indices. The VTU-O transmits a PMD.Synchflag primitive. After receiving the grant, the VTU-R also sends a PMD.Synchflag primitive to complete the PMD handshake. Then, the VTU-O and VTU-R are reconfigureds to the new profile. |
| T1d | PM1 | PM1 | Local command to the VTU-O | Following this event, the VTU-O sends a power management command with a set of new upstream tone group indices and downstream parameters (e.g., PMS parameters, tone group indices, etc.). The VTU-R grants profile change by transmitting a power management command with a set of new downstream tone group indices. The VTU-O transmits a PMD.Synchflag primitive (refer to the ADSL2 standard). After receiving the grant, the VTU-R also sends a PMD.Synchflag primitive to complete the PMD handshake. Then, the VTU-O and VTU-R are reconfigureds to the new profile. |
| T1x | PM1 | PM1 | Local primitives at VTU-O or VTU-R | Following the local primitives, the VTUs use a low power exit procedure (specified in Section 9.5.3.4 of the ADSL2 standard). The new PM1 state uses the default upstream and downstream profiles. |

PM commands may use management protocol specific-transmission convergence (MPS-TC) functions as specified in the G.992.3 and G.993.2 Recommendations. For illustrative purposes, some examplary PM commands are shown in Table 4. It should be understood that other PM commands, although not shown in Table 4, may also be similarly implemented using principles of the present disclosure. In Table 4, $N_{TG-PM-US}$ denotes a number of tone groups in an upstream link or direction, $N_{TG-PM-DS}$ denotes a number of tone groups in a downstream link, $N_d$ denotes a number of octets required to specify the downstream profile parameters. Definitions of other variables, such as $L_0$, $L_1$, $D_0$, $D_1$, etc., may be found in the G.992.3 or G.993.2 Recommendation.

TABLE 4 examples of PM commands.

| Name | Length (octets) | Octet number | Content |
|---|---|---|---|
| Type 1 (sent by initiating | 4 | 2 | $01_{16}$ |
| | | 3 | 1 octet for the requested upstream profile index (see |

TABLE 4-continued examples of PM commands.

| Name | Length (octets) | Octet number | Content |
|---|---|---|---|
| VTU-O) | | 4 | Note 1) 1 octet for the requested downstream profile index (see Note 1) |
| Type 2 (sent by initiating VTU-O) | $12 + 5N_{TG\text{-}PM\text{-}US}$ ($N_{TG\text{-}PM\text{-}US} <= 128$) | 2 | $02_{16}$ |
| | | 3 to 3 + 5 $N_{TG\text{-}PM\text{-}US}$ | 5 × $N_{TG\text{-}PM\text{-}US}$ octets the tone group parameter field for each tone group (see Note 2) |
| | | 4 + 5 $N_{TG\text{-}PM\text{-}US}$ to 5 + 5 $N_{TG\text{-}PM\text{-}US}$ | New value for $L_0$ |
| | | 6 + 5 $N_{TG\text{-}PM\text{-}US}$ to 7 + 5 $N_{TG\text{-}PM\text{-}US}$ | New value for $L_1$ |
| | | 8 + 5 $N_{TG\text{-}PM\text{-}US}$ to 9 + 5 $N_{TG\text{-}PM\text{-}US}$ | New value for $D_0$ |
| | | 10 + 5 $N_{TG\text{-}PM\text{-}US}$ to 11 + 5 $N_{TG\text{-}PM\text{-}US}$ | New value for $D_1$ |
| | | 12 + 5 $N_{TG\text{-}PM\text{-}US}$ | 1 octet for the requested downstream profile index (see Note 1) |
| Type 3 (sent by initiating VTU-O) | $4 + N_d$ | 2 | $03_{16}$ |
| | | 3 | 1 octet for the requested upstream profile index (see Note 1) |
| | | 4 to 4 + $N_d$ | Downstream profile parameters (see Note 4) |
| Type 4 (sent by initiating VTU-O) | $11 + 5N_{TG\text{-}PM\text{-}DS}$ ($N_{TG\text{-}PM\text{-}DS} <= 128$) | 2 | $04_{16}$ |
| | | 3 to 3 + 5 $N_{TG\text{-}PM\text{-}US}$ | 5 × $N_{TG\text{-}PM\text{-}US}$ octets the tone group parameter field for each tone group (see Note 2) |
| | | 4 + 5 $N_{TG\text{-}PM\text{-}US}$ to 5 + 5 $N_{TG\text{-}PM\text{-}US}$ | New value for $L_0$ |
| | | 6 + 5 $N_{TG\text{-}PM\text{-}US}$ to 7 + 5 $N_{TG\text{-}PM\text{-}US}$ | New value for $L_1$ |
| | | 8 + 5 $N_{TG\text{-}PM\text{-}US}$ to 9 + 5 $N_{TG\text{-}PM\text{-}US}$ | New value for $D_0$ |
| | | 10 + 5 $N_{TG\text{-}PM\text{-}US}$ to 11 + 5 $N_{TG\text{-}PM\text{-}US}$ | New value for $D_1$ |
| | | 12 + 5$N_{TG\text{-}PM\text{-}US}$ to 12 + 5$N_{TG\text{-}PM\text{-}US}$ + $N_d$ | Downstream profile parameters (see Note 4) |
| Type 5 (GRANT) sent by responding VTU-R | $11 + 5N_{TG\text{-}PM\text{-}DS}$ ($N_{TG\text{-}PM\text{-}DS} <= 128$) | 2 | $05_{16}$ |
| | | 3 to 3 + 5 $N_{TG\text{-}PM\text{-}DS}$ | 5 × $N_{TG\text{-}PM\text{-}DS}$ octets the tone group parameter field for each tone group (see Note 2) |
| | | 4 + 5 $N_{TG\text{-}PM\text{-}DS}$ to 5 + 5 $N_{TG\text{-}PM\text{-}DS}$ | New value for $L_0$ |
| | | 6 + 5 $N_{TG\text{-}PM\text{-}DS}$ to 7 + 5 $N_{TG\text{-}PM\text{-}DS}$ | New value for $L_1$ |
| | | 8 + 5 $N_{TG\text{-}PM\text{-}DS}$ to 9 + 5 $N_{TG\text{-}PM\text{-}DS}$ | New value for $D_0$ |
| | | 10 + 5 $N_{TG\text{-}PM\text{-}DS}$ to 11 + 5 $N_{TG\text{-}PM\text{-}DS}$ | New value for $D_1$ |

Note 1: This command may be used to change upstream and/or downstream profiles. If the message profile index is the same as a currently used profile, it is indicative that the profile needs to be kept the same as the current profile.
Note 2: The tone group parameter field may be defined similar to the sub-carrier parameter field in G.993.2, except that the B/G parameter applies to the entire tone group. Each tone group parameter field may contain 5 octets (i.e., 40 bits) formatted as [iiii iiii iiii jjjj jjjj jjjj gggg gggg gggg bbbb] to convey $g_i$ (12 bits) and $b_i$ (4 bits) values of the tone group (i, j) with starting i (12 bits) and ending j (12 bits) indices.
Note 3: Field #14 contains the starting and ending frequencies of the PM tone groups (as defined in G.993.2, §13.3). It may be formatted similar to a band descriptor (see Table 2), with a maximum of 128 tone groups.
Note 4: $N_d$ is the parameter to describe the new downstream (denoted as ds) profile. This field may contain elements such as a maximum nominal aggregate transmit power downstream (MAXNOMATPds), max/min target data-rate, max/min/target ds-snr-margin, highest allowed ds sub-carrier, ds power spectrum density (PSD) ceiling, max/min target ds message overhead, etc.

As listed in Table 4, a Type 1 command may be initiated with a request to switch or transition to a set of stored upstream and/or downstream profiles. In a Type 2 command, the VTU-O may send a set of new upstream tone group indices and a new downstream profile index. In a Type 3 command, the VTU-O may send an upstream profile index and a set of parameters for a new downstream profile. In a Type 4 command, the VTU-O may send new upstream profile tone group indices and a set of parameters for a new downstream profile. The Type 1, Type 2, Type 3, and Type 4 commands may be used respectively to implement the T1a, T1b, T1c, and T1d transitions described with respect to Table 3. In a Type 5 command, the VTU-R may respond by granting the state/profile transition.

As shown in Table 4, each of the PM commands comprises one or more profile indices and at least one tone group parameter field. Each of the at least one tone group parameter field may identify a tone group, thus at least one tone group may be identified. For instance, to identify a tone group, each tone group parameter field may contain 5 octets (i.e., 40 bits) formatted as [iiii iiii iiii jjjj jjjj jjjj gggg gggg gggg bbbb] to convey a gain value (denoted as $g_i$, 12 bits), a number of bits (denoted as $b_i$, 4 bits), a starting index (12 bits) and an ending index (12 bits) of the tone group.

As mentioned previously, in some DSL technologies such as VDSL2, a number of sub-carriers that need to be modified during a PM state/profile transition may be relatively large. Thus, in an embodiment, transceiver functions may comply with parameters defined in the G.993.2 Recommendation, such as a maximum number of tones that can be executed in a single step in the downstream direction ($G_{SOS}$). Each $G_{SOS}$ has an associated value of $T_{SOS}$, which denotes a period of time (in symbols) between execution of two successive groups of tones. The parameters $G_{SOS}$ and $T_{SOS}$ may be exchanged in the O-MSG1 and R-MSG2 messages (specified in G.993.2 Recommendation) during initialization procedures.

Figure 5A:
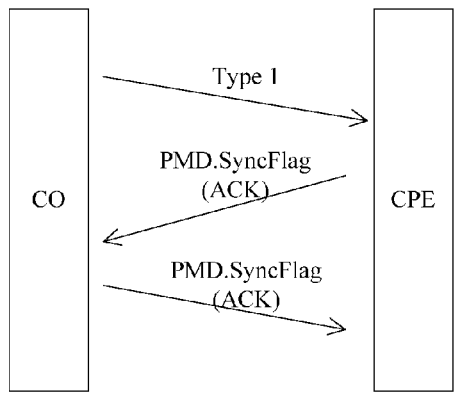
FIGS. 5A-5D are diagrams of embodiments of handshake procedures between a CO transceiver and a CPE transceiver.

FIGS. 5A-5D illustrate embodiments of handshake procedures between a CO transceiver (e.g., a VTU-O) and a CPE transceiver (e.g., a VTU-R). For conciseness, in FIGS. 5A-5D the CO transceiver and CPE transceiver are simply labeled and referred to as CO and CPE respectively. The handshake procedures may be used in aforementioned state/profile transitions and are described for further elucidation. As shown in FIG. 5A, the CO may first transmit the Type 1 command to the CPE. Then, the CPE may respond by transmitting a PMD.Synchflag primitive which is an acknowledgement (ACK) message. After receiving the response, the CO may transmit another PMD.Synchflag primitive to complete the handshake. After completion of the handshake procedure, the CO and CPE may be switched to a stored profile or state.

Figure 5B:
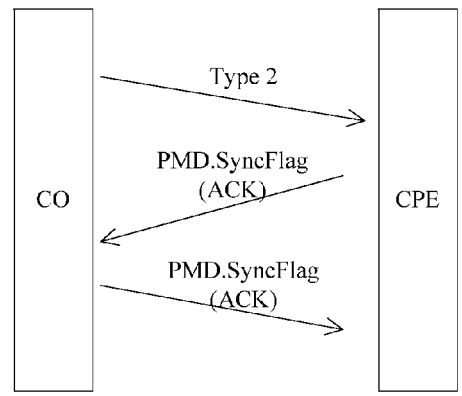

As shown in FIG. 5B, the CO may first transmit the Type 2 command to the CPE. Then, the CPE may respond by transmitting a PMD.Synchflag primitive which is an acknowledgement (ACK) message. After receiving the response, the CO may transmit another PMD.Synchflag primitive to complete the handshake. After completion of the handshake procedure, the CO and CPE may be switched to a new upstream profile or state and a stored downstream profile or state.

Figure 5C:
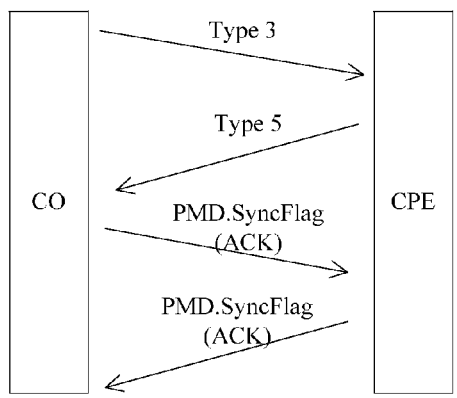

As shown in FIG. 5C, the CO may first transmit the Type 3 command to the CPE. Then, the CPE may grant the transition request by transmitting the Type 5 command. The CO may then respond by transmitting a PMD.Synchflag primitive which is an acknowledgement (ACK) message. After receiving the response, the CPE may transmit another PMD.Synchflag primitive to complete the handshake. After completion of the handshake procedure, the CO and CPE may be switched to a stored upstream profile or state and a new downstream profile or state.

Figure 5D:
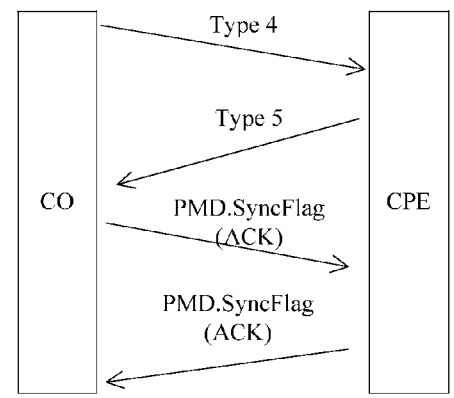

As shown in FIG. 5D, the CO may first transmit the Type 4 command to the CPE. Then, the CPE may grant the transition request by transmitting the Type 5 command. The CO may then respond by transmitting a PMD.Synchflag primitive which is an acknowledgement (ACK) message. After receiving the response, the CPE may transmit another PMD.Synchflag primitive to complete the handshake. After completion of the handshake procedure, the CO and CPE may be switched to a new upstream profile or state and a new downstream profile or state.

The present disclosure may support on-line reconfiguration (OLR), which is used by a transceiver to adapt to changes in operating conditions by reconfiguration of parameters (e.g., tone group, data rate, PMD and PMS parameters, etc.) without interrupting service, introducing errors, or changing latency. In an embodiment, OLR may be performed within a PM state, such as the full on state (i.e., the PM1 default state 204 in FIG. 2) and the low power state (i.e., the PM1 low power state 206 in FIG. 2). If an OLR procedure is successfully executed, after its completion, a transceiver (e.g., a modem) may decide to over-write a current profile by issuing a "profile save" command specified in a MPS-TC function.

In an embodiment, OLR commands are introduced to the PM1 state to realize various types of OLR including bit swapping (BS), seamless rate adaptation (SRA), and save our showtime (SOS). The OLR commands may allow up to 128 tone group-based BS, SRA and SOS reconfigurations. For example, if a set of sub-carriers become noisy on a subscriber line, and a transceiver wishes to maintain a data rate of the subscriber line, a BS command may be used to swap a tone group, so that a different set of bit loading may be used. As a result, the subscriber line may be stabilized.

Table 5 illustrates an embodiment of OLR commands, which may be introduced to the PM1 state disclosed herein. Table 5 is an extension of the Table 11-5/G.993.2 defined in the VDSL2 standard, thus its functioning is similar to the OLR commands listed in the Table 11-5/G.993.2. It should be understood that Table 5 only includes examples of OLR commands, thus other OLR commands, although not listed herein, can also be similarly implemented within the principles of the present disclosure. Herein, OLR Requests Type 5, Type 6, and Type 7 are different from aforementioned PM commands types such as Type 1, Type 2, Type 3, Type 4, and Type 5. In Table 5, $N_{TG-PM}$ denotes a number of power management tone groups, $N_{LP}$ denotes a number of active latency paths. Definitions of other variables, such as $L_0$, $L_1$, $D_0$, $D_1$, $L_p$, $T_p$, $G_p$, $B_{p0}$, $msg_p$, $D_p$ etc., may be found in the G.992.3 or G.993.2 Recommendation.

TABLE 5 examples of OLR commands sent by an initiating VTU.

| Name | Length (in octets) | Octet number | Content | Support |
|---|---|---|---|---|
| Request Type 5 (BS) | $5 + 4 \times N_{TG-PM}$ ($N_{TG-PM} \leq 128$) | 2 | $08_{16}$ (Note 1) | |
| | | 3 to 4 | 2 octets for the number of tone groups $N_{TG-PM}$ to be modified | |
| | | 5 to 4 + $4 \times N_{TG-PM}$ | $4 \times N_{TG-PM}$ octets describing the tone group parameter field for each tone group | |
| | | $5 + 4 \times N_{TG-PM}$ | 1 octet for Segment Code (SC) | |

TABLE 5-continued examples of OLR commands sent by an initiating VTU.

| Name | Length (in octets) | Octet number | Content | Support |
|---|---|---|---|---|
| Request Type 6 (SRA)(Note 6) | $5 + 7 N_{LP} + 4 N_{TG-PM}$ ($N_{TG-PM} \leq 128$) | 2 | $09_{16}$ (Note 1) | |
| | | 3 to $2 + 2 N_{LP}$ | $2 \times N_{LP}$ octets containing the new $L_p$ values for each of the active latency paths ($N_{LP}$ = number of active latency paths) (Notes 2 and 3) | |
| | | $3 + 2 N_{LP}$ to $2 + 4 N_{LP}$ | $2 \times N_{LP}$ octets containing the new $D_p$ values for each of the active latency paths ($N_{LP}$ = number of active latency paths) (Note 4) | |
| | | $3 + 4 N_{LP}$ to $2 + 5 N_{LP}$ | $N_{LP}$ octets containing the new $T_p$ values for each of the active latency paths ($N_{LP}$ = number of active latency paths) (Notes 2, 3, 5) | |
| | | $3 + 5 N_{LP}$ to $2 + 6 N_{LP}$ | $N_{LP}$ octets containing the new $G_p$ values for each of the active latency paths ($N_{LP}$ = number of active latency paths) (Notes 2, 3, 5) | |
| | | $3 + 6 N_{LP}$ to $2 + 7 N_{LP}$ | $N_{LP}$ octets containing the new $B_{p0}$ values for each of the active latency paths ($N_{LP}$ = number of active latency paths) (Notes 2, 3, 5) | |
| | | $3 + 7 N_{LP}$ to $4 + 7 N_{LP}$ | 2 octets for the number of tone groups $N_{TG-PM}$ to be modified | |
| | | $5 + 7 N_{LP}$ to $4 + 7 N_{LP} + 4 N_{TG-PM}$ | $4 N_{TG-PM}$ octets describing the tone group parameter field for each tone group | |
| | | $5 + 7 N_{LP} + 4 N_{TG-PM}$ | 1 octet for Segment Code (SC) | |
| Request Type 7 (SOS) | $N_{TG-PM}/2 + 11$ | 2 | $0a_{16}$ (Note 1) | |
| | | 3 | Message ID | |
| | | 4 to $N_{TG-PM}/2 + 3$ | $\Delta b(2)$    $\Delta b(1)$<br>$\Delta b(4)$    $\Delta b(3)$<br>...<br>$\Delta b(N_{TG-PM})$    $\Delta b(N_{TG-PM} - 1)$ | |
| | | $N_{TG-PM}/2 + 4$ to $N_{TG-PM}/2 + 5$ | New value for $L_0$ | |
| | | $N_{TG-PM}/2 + 6$ to $N_{TG-PM}/2 + 7$ | New value for $L_1$ | |
| | | $N_{TG-PM}/2 + 8$ to $N_{TG-PM}/2 + 9$ | New value for $D_0$ | |
| | | $N_{TG-PM}/2 + 10$ to $N_{TG-PM}/2 + 11$ | New value for D1 | |

Note 1 - All other values for octet number 2 are reserved by ITU-T.
Note 2 - For this command, any change in $L_p$, $T_p$, $G_p$, and $B_{p0}$ values shall be such that the length of the MDF (as defined in Table 9-6) remains unchanged for all active latency paths.
Note 3 - To keep the $msg_p$ value within its valid range for relatively large changes of $L_p$, it may be necessary to change all of the $T_p$, $G_p$, and $B_{p0}$ values.
Note 4 - If a change of $D_p$ is not supported, the value of this parameter shall be identical to that currently used.
Note 5 - If a change of $T_p$, $G_p$ and $B_{p0}$ is not supported, the values of these parameters shall be identical to those currently used.
Note 6 - When $N_{LP}$ = 2, the octets associated with latency path 0 are sent first.

As shown in the Table 5, the Request Type 5 implements a BS reconfiguration, which may reallocate bits and power among the allowed tone groups without modification of higher layer features of the physical layer. For instance, BS may reconfigure the bit and gain parameters without changing any other PMD or PMS-transmission convergence (PMS-TC) control parameters. The Request Type 6 implements a SRA reconfiguration, which may reconfigure a total data rate of a DSL line by modifying framing parameters and modifying the bits and fine gains parameters. The Request Type 7 implements a SOS reconfiguration, which may allow a VDSL 2 transceiver to rapidly perform a bit loading reduction in a specified part of the frequency spectrum. The bit loading reduction may be used, e.g., in case of a sudden noise increase in the DSL line.

In practice, for a VDSL2 transceiver, the design of an OLR algorithm may take into account various factors. For example, in an embodiment, all sub-carriers in a tone group have the same B/G values. In an embodiment, BS may only happen between tone groups with the same number of sub-carriers. SRA may increase or decrease a number of bits within a tone group. In an embodiment, if a SOS needs to be performed, PM tone groups rather than SOS tone groups are used. Moreover, if desired, after successful completion of an OLR procedure, a VTU-O may use a command to overwrite an existing profile with new parameters. Overall, the ability to support OLR may improve robustness of the PM states such as the low power state.

Figure 6A:
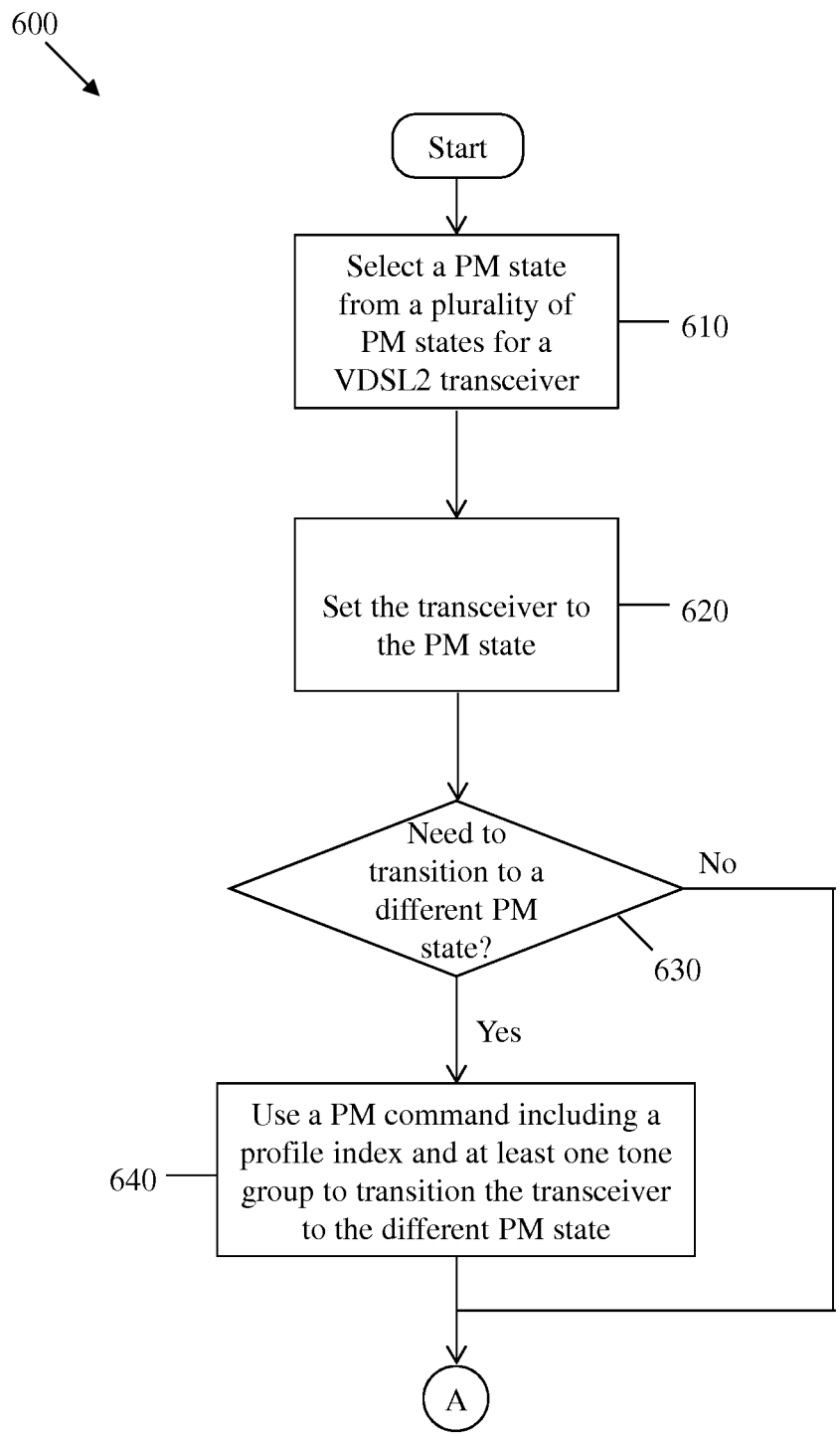
FIGS. 6A-6B is a flowchart of an embodiment of a power management method.
Figure 6B:
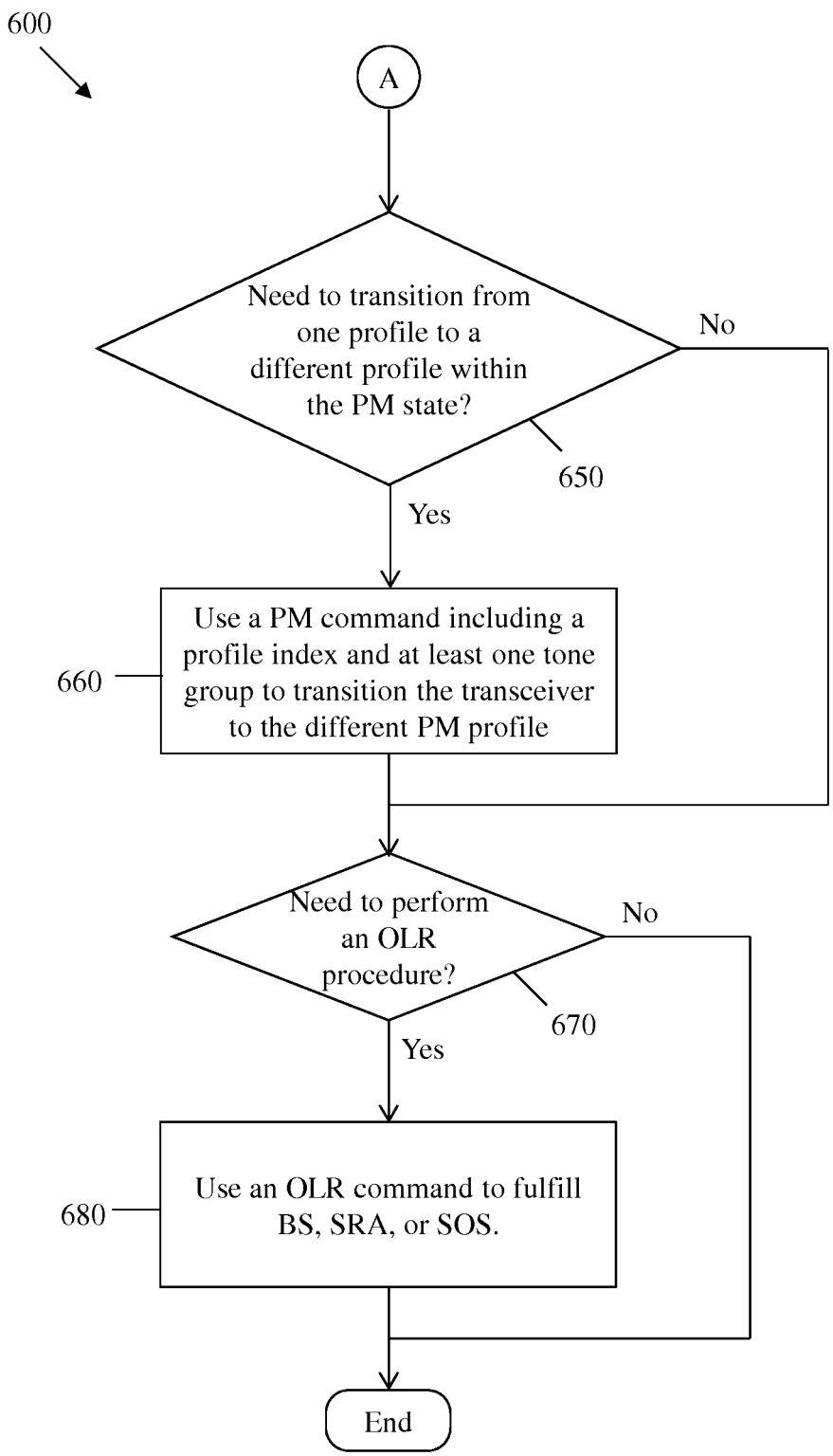

FIGS. 6A-6B is a flowchart of an embodiment of a power management method 600, which may be implemented in a VDSL2 system (e.g., the VDSL2 system 100 in FIG. 1). The method 600 may start in step 610, where a management entity (e.g., a CO including the exchange 102) may select a PM state for a transceiver. The PM state may be selected from a plurality of PM states including a full on state, a low power state, and an idle state. In an embodiment, the full on state comprises a full on PM profile, and the low power state comprises at least one low power PM profile. Each of the PM profiles may be assigned a profile index, which may help reduce system complexity. Next, in step 620, the management entity may instruct the transceiver to use the PM state. Next, in step 630, the method 600 may determine if it is necessary to transition the transceiver from the PM state to another PM state. If the condition in the block 630 is met, the method 600 may proceed to step 640. Otherwise, the method 600 may proceed to step 650.

In step 640, a PM command may be used for the state transition. In an embodiment, the PM command comprises a profile index and at least one tone group parameter field, wherein each of the at least one tone group parameter field identifies a tone group, wherein the tone group represents a set of sub-carriers, wherein the set of sub-carriers includes a starting sub-carrier with a first index and an ending sub-carrier with a second index, wherein each of the set of sub-carriers has an equal number of bits and gains.

In step 650, the method 600 may determine if it is necessary to transition the transceiver from one profile of the PM state to another profile of the PM state. In an embodiment, the PM profile is the low power state. If the condition in the block 650 is met, the method 600 may proceed to step 660. Otherwise, the method 600 may proceed to step 670. In step 660, a PM command comprising a profile index and at least one parameter field identifying tone group(s) may be used for the profile transition.

In step 670, the method 600 may determine if it is necessary to perform an online reconfiguration procedure. In an embodiment, the PM profile is the low power state. If the condition in the block 670 is met, the method 600 may proceed to step 680. Otherwise, the method 600 may end. In step 680, an OLR command may be used to perform the OLR procedure. The OLR command may be a Request Type 5 fulfilling bit swapping (BS), or a Request Type 6 fulfilling seamless rate adaptation (SRA), or a Request Type 7 fulfilling save our showtime (SOS).

Figure 7:
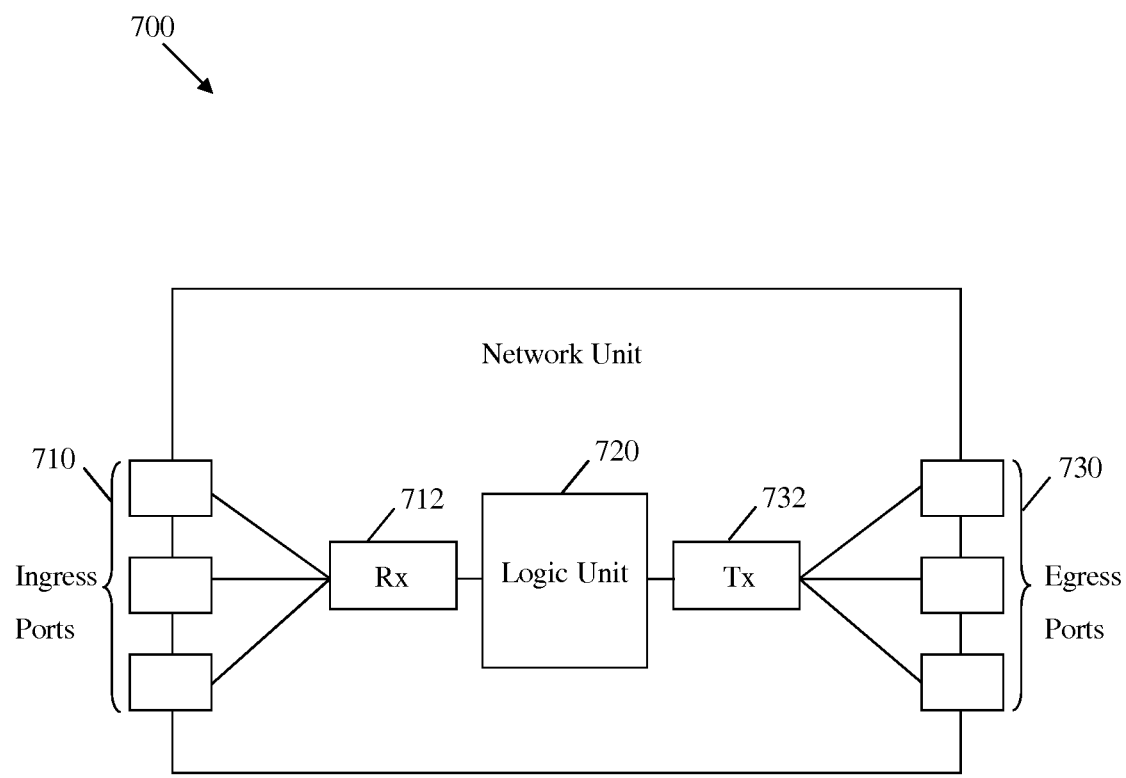
FIG. 7 is a schematic diagram of an embodiment of a network unit.

FIG. 7 illustrates an embodiment of a network unit 700, which may comprise, for example, a transceiver as described above within a network or system. The network unit 700 may comprise a plurality of ingress ports 710 and/or receiver units (Rx) 712 for receiving data from other network units or components, logic unit or processor 720 to process data and determine which network unit to send the data to, and a plurality of egress ports 730 and/or transmitter units (Tx) 732 for transmitting data to the other network units. The logic unit or processor 720 may be configured to implement any of the schemes described herein, such as the power management scheme 200 and the power management method 600. The logic unit 720 may be implemented using hardware, software, or both.

Figure 8:
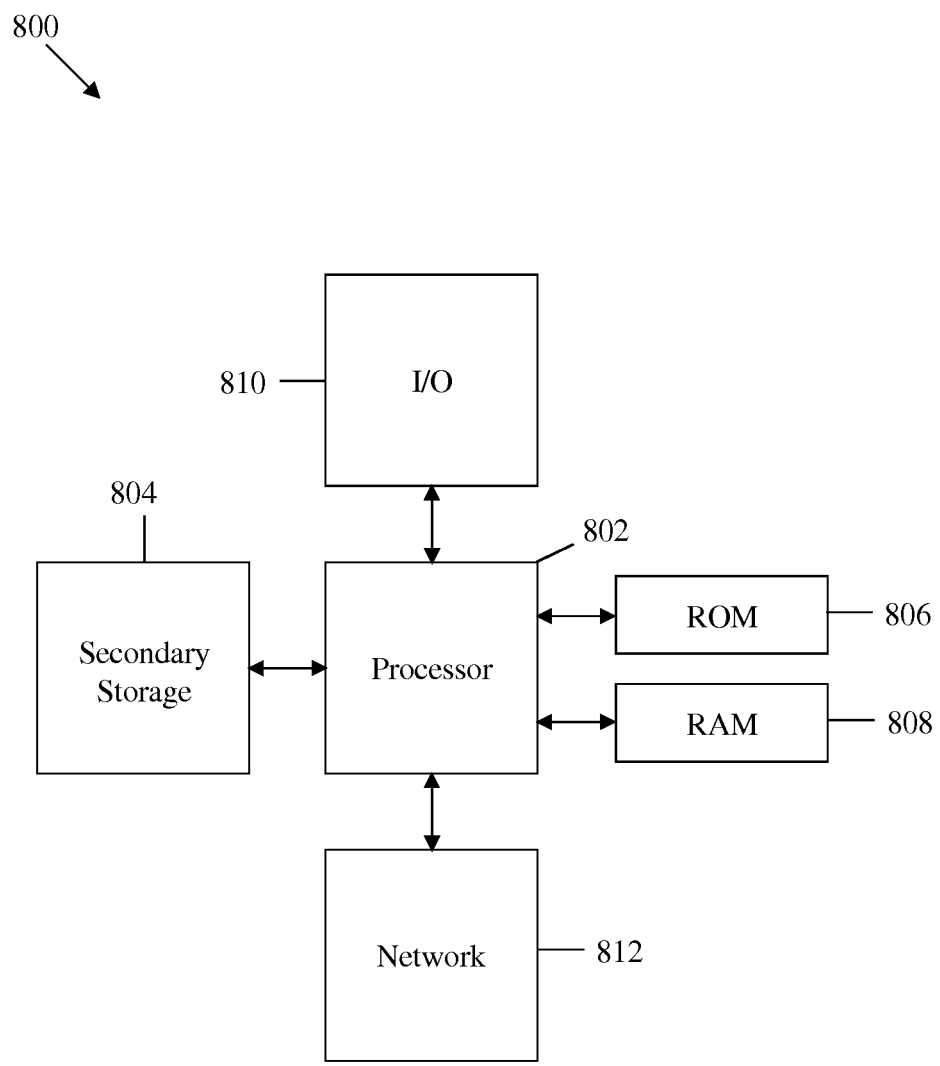
FIG. 8 is a schematic diagram of an embodiment of a general-purpose computer system.

The schemes described above may be implemented on any general-purpose network component, such as a computer or network component with sufficient processing power, memory resources, and network throughput capability to handle the necessary workload placed upon it. FIG. 8 illustrates a schematic diagram of a typical, general-purpose network component or computer system 800 suitable for implementing one or more embodiments of the methods disclosed herein, such as the power management scheme 200 and the power management method 600. The general-purpose network component or computer system 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. Although illustrated as a single processor, the processor 802 is not so limited and may comprise multiple processors. The processor 802 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 802 may be configured to implement any of the schemes described herein, including the power management scheme 200 and the power management method 600. The processor 802 may be implemented using hardware, software, or both.

The secondary storage 804 is typically comprised of one or more disk drives or tape drives and is used for non-volatile storage of data and as an over-flow data storage device if the RAM 808 is not large enough to hold all working data. The secondary storage 804 may be used to store programs that are loaded into the RAM 808 when such programs are selected for execution. The ROM 806 is used to store instructions and perhaps data that are read during program execution. The ROM 806 is a non-volatile memory device that typically has a small memory capacity relative to the larger memory capacity of the secondary storage 804. The RAM 808 is used to store volatile data and perhaps to store instructions. Access to both the ROM 806 and the RAM 808 is typically faster than to the secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a processor configured to:
determine a power management (PM) state from a plurality of PM states for a digital subscriber line (DSL) transceiver, wherein the plurality of PM states comprise an idle state, a full on state, and a low power state, wherein the full on state consumes more power than the low power state, wherein the low power state consumes more power than the idle state, and wherein the DSL transceiver supports a very high speed digital subscriber line 2 (VDSL2) data transmission protocol;
instruct the DSL transceiver to use the PM state; and
instruct the DSL transceiver to transition from a first PM profile corresponding to the PM state to a second PM profile corresponding to the PM state using a PM command that comprises a profile index that identifies the second PM profile.

2. The apparatus of claim 1, wherein the low power state comprises at least two low power PM profiles, wherein each of the at least two lower power PM profiles comprises a plurality of parameters, and wherein at least one of the plurality of the parameters is different for each PM profile.

3. The apparatus of claim 2, wherein the plurality of parameters include physical media dependent (PMD) and physical media specific (PMS) control parameters, and wherein one of the lower power PM profile is a default profile.

4. The apparatus of claim 1, wherein the processor is further configured to: transition the DSL transceiver from the PM state to a second PM state of the plurality of PM states and wherein the second PM is stored locally within the DSL transceiver.

5. An apparatus comprising:
processor configured to:
determine a power management (PM) state from a plurality of PM states for a digital subscriber line (DSL) transceiver, wherein the plurality of PM states comprise an idle state, a full on state, and a low power state, wherein the full on state consumes more power than the low power state, wherein the low power state consumes more power than the idle state, wherein the low power state comprises at least two PM profile, wherein the DSL transceiver supports a very high speed digital subscriber line 2 (VDSL2) data transmission protocol; and
instruct the DSL transceiver to use the PM state; and
transition the DSL transceiver from the PM state to a second PM state of the plurality of PM states,
wherein the full on state comprises a full on PM profile,
wherein each of the at least two PM profiles and the full on PM profile comprises one profile index,
wherein transitioning the DSL transceiver from the PM state to the second PM state uses a PM command, and
wherein the PM command comprises a profile index of the second PM state.

6. The apparatus of claim 5, wherein the PM state is the low power state, wherein the low power state comprises a first PM profile and a second PM profile, and wherein the processor is further configured to transition the DSL transceiver from the first PM profile to the second PM profile.

7. The apparatus of claim 6, wherein the first and second PM profiles are upstream profiles.

8. The apparatus of claim 6, wherein transitioning the DSL transceiver from the first PM profile to the second PM profile uses a second PM command, and wherein the second PM command comprises a profile index of the second PM profile.

9. The apparatus of claim 8, wherein each profile index comprises a first position and a second position, wherein the first position is configured to store an index of a downstream profile, and wherein the second position is configured to store an index of an upstream profile.

10. The apparatus of claim 8, wherein the PM command and the second PM command are selectable from a plurality of PM commands, and wherein the plurality of PM commands comprises a Type 1 command, a Type 2 command, a Type 3 command, a Type 4 command, and a Type 5 command.

11. The apparatus of claim 10, wherein each of the plurality of PM commands comprises at least one tone group parameter field, wherein each of the at least one tone group parameter field identifies a tone group, and wherein the tone group represents a set of sub-carriers.

12. The apparatus of claim 11, wherein the set of sub-carriers includes a starting sub-carrier with a first index and an ending sub-carrier with a second index, and wherein the tone group is identified by the first and second indices.

13. The apparatus of claim 11, wherein each of the set of sub-carriers has an equal number of bits and gains.

14. The apparatus of claim 11, wherein the at least one tone group parameter field identifies at least one tone group, and wherein a maximum number of the at least one tone group is 128.

15. The apparatus of claim 5, wherein the processor is further configured to use an online reconfiguration (OLR) command to perform an OLR procedure on the DSL transceiver.

16. The apparatus of claim 15, wherein the OLR procedures fulfills one of a plurality of OLR types, and wherein the plurality of OLR types include bit swapping (BS), seamless rate adaptation (SRA), and save our showtime (SOS).

17. The apparatus of claim 15, wherein the OLR command is a Request Type 5 fulfilling a bit swapping (BS).

18. The apparatus of claim 5, wherein the DSL transceiver is a VDSL2 transceiver unit (VTU) at an optical network unit (VTU-O).

19. The apparatus of claim 15, wherein the OLR command is a Request Type 6 fulfilling a seamless rate adaptation (SRA).

20. The apparatus of claim 15, wherein the OLR command is a Request Type 7 fulfilling a save our showtime (SOS).

21. A method comprising:
    determining a power management (PM) state from a plurality of PM states for a digital subscriber line (DSL) transceiver, wherein the plurality of PM states comprise an idle state, a full on state, and a low power state, wherein the full on state consumes more power than the low power state, wherein the low power state consumes more power than the idle state, and wherein the DSL transceiver supports a very high speed digital subscriber line 2 (VDSL2) data transmission protocol;
    instructing the DSL transceiver to use the PM state; and
    instructing the DSL transceiver to transition from a first PM profile within the PM state to a second PM profile within the PM state using a PM command that comprises a profile index that identifies the second PM profile.

22. The method of claim 21, wherein the low power state comprises at least two low power PM profiles, wherein each of the at least two low power PM profiles comprises a plurality of parameters, and wherein at least one of the plurality of the parameters is different for each PM profile.

23. The method of claim 22, wherein the plurality of parameters include physical media dependent (PMD) and physical media specific (PMS) control parameters, and wherein one of the lower power PM profiles is designated as a default profile.

24. The method of claim 21, further comprising transitioning the DSL transceiver from the PM state to a second PM state of the plurality of PM states, wherein the second PM profile is stored locally within the DSL transceiver.

25. A method comprising;
    determining a power (PM) state from a plurality of PM states for a digital subscriber line (DSL) transceiver, wherein the plurality of PM states comprise an idle state, a full on state, and a low power state, wherein the full on state consumes more power than the low power state, wherein the low power state consumes more power than the idle state, wherein the low power state comprises at least two PM profiles, and wherein the DSL transceiver supports a very high speed digital subscriber line 2 (VDSL2) data transmission protocol;
    instructing the DSL transceiver to use the PM state; and
    transitioning the DSL transceiver from the PM state to a second PM state of the plurality of PM states,
    wherein the full on state comprises a full on PM profile,
    wherein each of the at least two PM profiles and the full on PM profile comprises one profile index,
    wherein transitioning the DSL transceiver from the PM state to the second PM state uses a PM command, and
    wherein the PM command comprises a profile index of the second PM state.

26. The method of claim 25, wherein the PM state is the low power state, wherein the low power state comprises a first PM profile and a second PM profile, and wherein the method further comprises transitioning the DSL transceiver from the first PM profile to the second PM profile.

27. The method of claim 26, wherein the first and second PM profiles are upstream profiles.

28. The method of claim 26, wherein transitioning the DSL transceiver from the first PM profile to the second PM profile uses a second PM command, and wherein the second PM command comprises a profile index of the second PM profile.

29. The method of claim 28, wherein each profile index comprises a first position and a second position, wherein the first position is configured to store an index of a downstream profile, and wherein the second position is configured to store an index of an upstream profile.

30. The method of claim 28, wherein the PM command and the second PM command are selectable from a plurality of PM commands, and wherein the plurality of PM commands comprises a Type 1 command, a Type 2 command, a Type 3 command, a Type 4 command, and a Type 5 command.

31. The method of claim 30, wherein each of the plurality of PM commands comprises at least one tone group parameter field, wherein each of the at least one tone group parameter field identifies a tone group, and wherein the tone group represents a set of sub-carriers.

32. The method of claim 31, wherein the set of sub-carriers includes a starting sub-carrier with a first index and an ending sub-carrier with a second index, and wherein the tone group is identified by the first and second indices.

33. The method of claim 31, wherein each of the set of sub-carriers has an equal number of bits and gains.

34. The method of claim 31, wherein the at least one tone group parameter field identifies at least one tone group, and wherein a maximum number of the at least one tone group is 128.

35. The method of claim 25, further comprising using an online reconfiguration (OLR) command to perform an OLR procedure on the DSL transceiver.

36. The method of claim 35, wherein the OLR procedures fulfills one of a plurality of OLR types, and wherein the plurality of OLR types include bit swapping (BS), seamless rate adaptation (SRA), and save our showtime (SOS).

37. The method of claim 35, wherein the OLR command is a Request Type 5 fulfilling a bit swapping (BS).

38. The method of claim 25, wherein the DSL transceiver is a VDSL2 transceiver unit (VTU) at an optical network unit (VTU-O).

39. The method of claim 35, wherein the OLR command is a Request Type 6 fulfilling a seamless rate adaptation (SRA).

40. The method of claim 35, wherein the OLR command is a Request Type 7 fulfilling a save our showtime (SOS).

41. An apparatus comprising:
a digital subscriber line (DSL) transceiver configured to:
- receive a power management (PM) command comprising information regarding a PM state, wherein the PM state is selectable from a plurality of available PM states, wherein the plurality of available PM states comprise a full on state, a low power state, and an idle state, wherein the full on state consumes more power than the low power state, wherein the low power state consumes more power than the idle state, wherein the DSL transceiver supports a very high speed digital subscriber line 2 (VDSL2) data transmission protocol;
- transition to the PM state based on the PM command, wherein a plurality of PM profiles are associated with the PM state; and
- transition, within the PM state, from a first PM profile of the PM profiles to a second PM profile of the PM profiles based on a second PM command that comprises a profile index that identifies the second PM profile.

42. An apparatus comprising:
a digital subscriber line (DSL) transceiver configured to:
- receive a power management (PM) command comprising information regarding a PM state, wherein the PM state is selectable from a plurality of available PM states, wherein the plurality of available PM states comprise a full on state, a low power state, and an idle state, wherein the full on state consumes more power than the low power state, wherein the low power state consumes more power than the idle state, wherein the low power state comprises at least two PM profiles, wherein the DSL transceiver supports a very high speed digital subscriber line 2 (VDSL2) data transmission protocol; and
- transition to the PM state based on the PM command, wherein the full on state comprises a full on PM profile, wherein each of the at least two PM profiles and the full on PM profile comprises one profile index, and wherein the PM command comprises a profile index of the PM state.

43. The apparatus of claim 42, wherein the PM command is a Type 1 command, a Type 2 command, a Type 3 command, a Type 4 command, or a Type 5 command.

44. The apparatus of claim 41, wherein the PM command comprises at least one tone group parameter field, wherein each of the at least one tone group parameter field identifies a tone group, wherein the tone group represents a set of sub-carriers, wherein the set of sub-carriers includes a starting sub-carrier with a first index and an ending sub-carrier with a second index, and wherein each of the set of sub-carriers has an equal number of bits and gains.

45. The apparatus of claim 41, wherein the processor is further configured to use an online reconfiguration (OLR) command to perform an OLR procedure on the DSL transceiver, wherein the OLR command is a Request Type 5 fulfilling bit swapping (BS), or a Request Type 6 fulfilling seamless rate adaptation (SRA), or a Request Type 7 fulfilling save our showtime (SOS).

* * * * *

UNITED STATES PATENT AND TRADEMARK OFFICE
CERTIFICATE OF CORRECTION

PATENT NO. : 8,787,558 B2  
APPLICATION NO. : 13/566607  
DATED : July 22, 2014  
INVENTOR(S) : Sanjay Gupta It is certified that error appears in the above-identified patent and that said Letters Patent is hereby corrected as shown below:

In the Claims

Column 22, Lines 21 and 29, Claim 5 should read:

An apparatus comprising:
  a processor configured to:
  determine a power management (PM) state from a plurality of PM states for a digital subscriber line (DSL) transceiver, wherein the plurality of PM states comprise an idle state, a full on state, and a low power state, wherein the full on state consumes more power than the low power state, wherein the low power state consumes more power than the idle state, wherein the low power state comprises at least two PM profiles one PM profile, wherein the DSL transceiver supports a very high speed digital subscriber line 2 (VDSL2) data transmission protocol; and
    instruct the DSL transceiver to use the PM state; and
    transition the DSL transceiver from the PM state to a second PM state of the plurality of PM states,
    wherein the full on state comprises a full on PM profile,
    wherein each of the at least two PM profiles and the full on PM profile comprises one profile index,
    wherein transitioning the DSL transceiver from the PM state to the second PM state uses a PM command, and
    wherein the PM command comprises a profile index of the second PM state.

Signed and Sealed this  
Thirtieth Day of September, 2014

Michelle K. Lee  
*Deputy Director of the United States Patent and Trademark Office*